(12) United States Patent
Orii et al.

(10) Patent No.: US 6,444,132 B1
(45) Date of Patent: Sep. 3, 2002

(54) FREE ABRASIVE SLURRY COMPOSITIONS

(75) Inventors: Kazuya Orii; Tetsuyuki Itakura, both of Tokyo; Masahiro Sasaki, Saku-machi; Yasutoshi Fujita, Saku; Masao Yamaguchi, Komoro, all of (JP)

(73) Assignees: Tokyo Magnetic Printing Co., Ltd., Tokyo (JP); TDK Corporation, Tokyo (JP)

( * ) Notice: Subject to any disclaimer, the term of this patent is extended or adjusted under 35 U.S.C. 154(b) by 0 days.

(21) Appl. No.: 09/294,747

(22) Filed: Apr. 19, 1999

(30) Foreign Application Priority Data

Apr. 23, 1998 (JP) .......................... 10-113327
Sep. 9, 1998 (JP) .......................... 10-255022

(51) Int. Cl.$^7$ .............................. G11B 5/127
(52) U.S. Cl. ................. 216/22; 451/36; 252/79.1
(58) Field of Search ................. 252/79.1; 451/36; 510/268, 270; 216/22

(56) References Cited

U.S. PATENT DOCUMENTS 6,050,879 A * 4/2000 Dubrovskiy et al. .......... 451/36
6,166,879 A * 12/2000 Jordan ........................ 360/122

FOREIGN PATENT DOCUMENTS

| EP | 0239084 | * | 9/1987 |
| JP | 62259228 | * | 11/1987 |
| JP | 09036074 | * | 2/1997 |
| JP | 11140431 | * | 5/1999 |
| JP | 2000001666 | * | 1/2000 |
| JP | 2000114212 | * | 4/2000 |
| WO | WO 86/2832 | * | 5/1986 |
| WO | WO 93/22103 | * | 11/1993 |
| WO | WO 98/42791 | * | 10/1998 |

OTHER PUBLICATIONS

P.C.H. Mitchell: "Oil Soluble Mo–S Compounds as Lubricant Additive", Wear, 100(1984), pp. 281–300.

"Sekiyu Seihin Tenkazai No Kaithatsu to Saishin Gijutsu" (Developments and Latest Technologies of Oil Product Additives), complied by Heichachiro Okabe, CMC (1998), pp. 99–106.

* cited by examiner

Primary Examiner—Yolanda Wilkins
Assistant Examiner—Allan Olsen
(74) Attorney, Agent, or Firm—Wood, Phillips, Katz, Clark & Mortimer (57) ABSTRACT

This invention relates to free abrasive slurries suited for use in polishing workpieces composed of materials varying in hardness, uniformly without selective polishing or working without difference in the amounts of polishing for different materials. The subject matter of this invention is a free abrasive slurry composition for polishing workpieces in which at least one soft material with a Vickers hardness in the range of 26 to 360 and at least one hard material with a Vickers hardness in the range of 700 to 4000 are mixedly present, comprising a polyol with a molecular weight ranging from 300 to 20000, a polishing powder, a dispersion medium, and optionally a surfactant.

6 Claims, 2 Drawing Sheets

1: AlTic (Al$_2$O$_3$·TiC); 2: Alumina (Al$_2$O$_3$); 3: Sendust (FeAlSi);
4: Alumina; 5: MR element; 6: Alumina; 7: Permalloy (FeNi);
8: Alumina; 9: Permalloy; 10: Alumina; 11: Copper

FREE ABRASIVE SLURRY COMPOSITIONS

DETAILED DESCRIPTION OF THE INVENTION

1. Field of the Invention

This invention relates to free abrasive slurries suited for use in polishing workpieces composed of materials varying in hardness, uniformly without selective polishing or working without difference in the amounts of polishing for different materials. The invention also relates to a method of manufacturing thin film magnetic heads which involves height polishing with a free abrasive slurry composition suited for use in lapping of thin film magnetic heads provided with a slider having an air bearing surface (hereinafter called "ABS"), uniformly without selective polishing or working without difference in the amounts of polishing for different materials.

2. Prior Art

In recent years there have been growing demands for optical, electronic, and precision equipment parts with more and more enhanced functions and performances than before. For those parts a very wide range of materials have come into use, including various metal crystal materials, ceramics, glass, and plastics. Consequently, polishing has found a broadening range of applications in the fields of parts composed of a plurality of materials varying in hardness. Typical of the polishing of such composite materials are the uniform finishing of conductive metal and interlayer insulation film in the course of multilayer interconnection of LSIs and in the end polishing of optical fiber connectors among optical components.

Meanwhile, improvements in hard disk drives have been made year after year for higher recording density of the disk, a recording medium for computers. As a means of achieving the higher recording density, efforts have been made for "lower head floating", so called because the floating gap between each hard disk and the magnetic head is decreased and the disc-head space is narrowed down.

The magnetic heads mounted in hard disk drives are predominantly of the thin film type. They are built of a composite material, e.g., a ceramic such as AlTiC ($Al_2O_3$—TiC) as a base and metallic films of magnetic materials such as Permalloy (Fe—Ni) and Sendust (Fe—Al—Si).

Today the floating type magnetic heads are generally manufactured through a sequence of the following steps.

1. Bar cutting

Figures 1A, 1B:
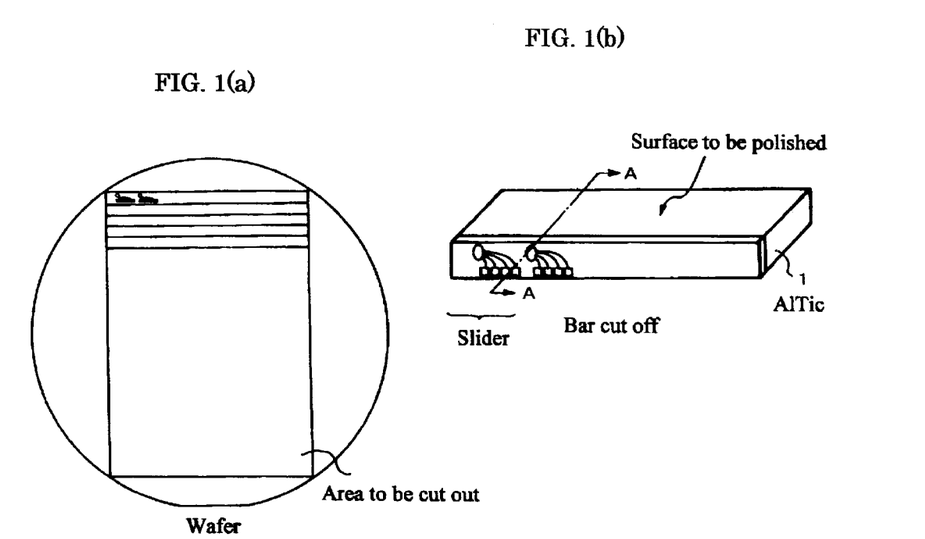

The bar, as shown in FIGS. 1a–1b, is cut off from a wafer composed of a number of magneto resistive elements arranged in a matrix form. A plurality of sliders are arranged in a row. Shows a schematically a bar cut out from a wafer to form a magnetic head element as a workpiece to be polished.

Figure 3:
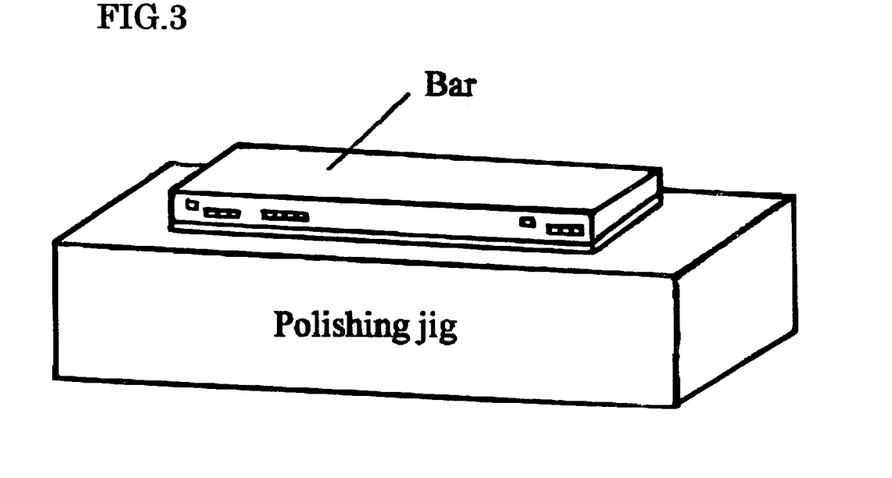
FIG. 3 Is a perspective view of the bar attached to a polishing jig.

2. Bonding the bar to a work jig (see FIG. 3).
3. Bar lapping (see FIG. 4).

Figure 4:
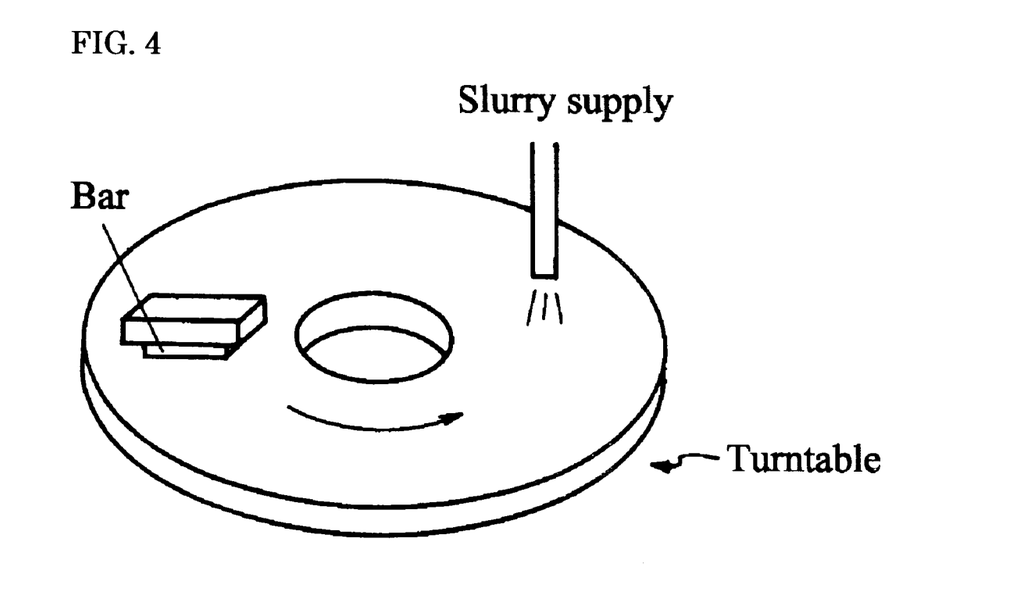
FIG. 4 Is a perspective view of a typical arrangement for the lapping of the bar.

By lapping is meant a process in which, as FIG. 4 illustrates, the ABS of a slider is polished by placing the workpiece on a plate made chiefly of tin or the like and being rotated with a constant supply of a free abrasive slurry or the like.

4. Separation of the bar from the jig.
5. Rail etching.
6. Cutting sliders away from the bar.

In the above sequence of steps, 3. Bar lapping is the step that involves the polishing concerned with the present invention. Among slider working methods the most common particularly for the air bearing surface consists in throat height polishing or MR height polishing (both being collectively called "height polishing") with a free abrasive slurry and final polishing as the final stage of the height polishing or after the height polishing.

Figure 2:
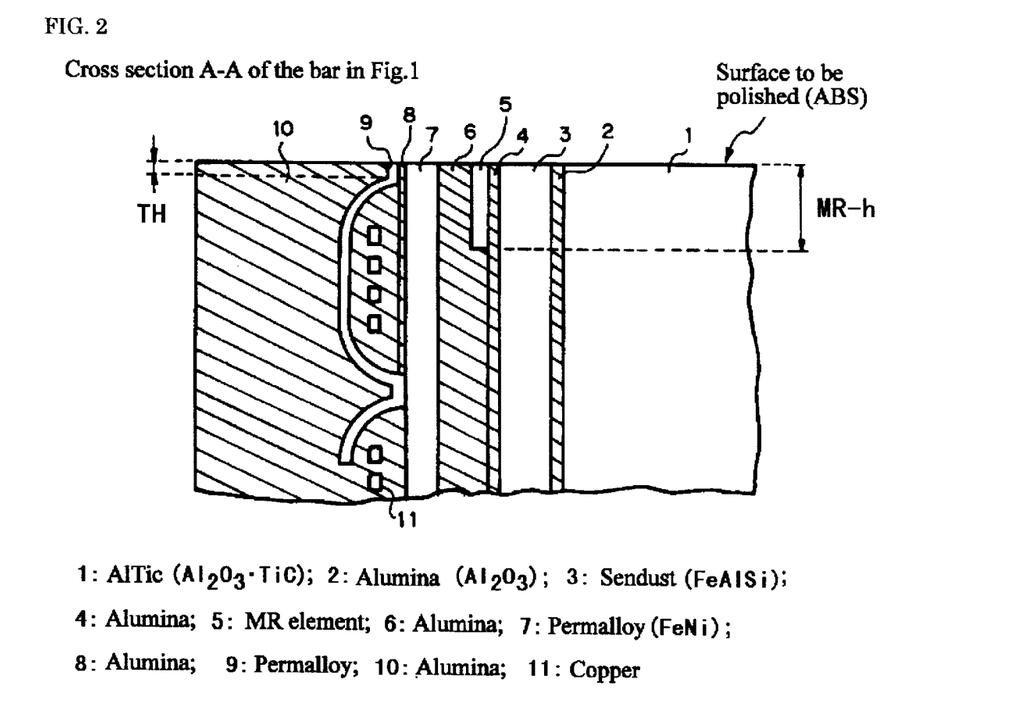
FIG. 2 Is a fragmentary cross sectional view taken along the line A—A of FIG. 1(*a*) illustrating the structure of the bar as a magnetic head element.

The term "throat height" (Throat height: TH) as used herein means one of the factors that determine the record writing characteristics of a thin film magnetic head. As indicated at TH in FIG. 2, the throat height represents the length of a magnetic pole region or the distance from the ABS to the edge of an insulation layer that electrically isolates a thin film coil. Machining for finishing the throat height to a desired length is known as throat height polishing. Among thin film magnetic heads, those equipped with a magnetoresistance regenerative element are called MR heads, and a deciding factor for the recording-reproducing characteristics of an MR head is the height of its magnetoresistance regenerative element, known as MR height (or MR-h). The MR-h, as indicated in FIG. 2, represents the length as measured from the ABS of the magnetoresistance regenerative element whose end is exposed to the ABS. Machining to attain an MR-h of a desired length is known as MR-h polishing.

When the height polishing of the ABS of thin film magnetic heads made of ceramic-metal film composite material is carried out using a conventional free abrasive slurry, step-like irregularities result in most cases from the differences in hardness among the component materials, for example, by the selective polishing of the metallic films of Permalloy, Sendust, etc. which are soft materials used for the pole regions. The selective polishing of the pole material composed of the metallic films of Permalloy, Sendust, etc. leads to the recession of the metallic films in the pole and nearby regions from the ABS of ceramics.

The recession, known as pole tip recession or PTR, increases the magnetic distance from the recording medium, resulting in a substantial increase in the degree of floating of the head. For the prior art polishing with an ordinary free abrasive slurry, therefore, final polishing at the final stage of, or after, the height polishing has been essential to reduce the amount of recession from the floating surface that has resulted from the selective polishing of the pole region.

The final polishing is imperative also to moderate or eradicate the scratches and irregularities on the surface, especially of metallic films of Permalloy, Sendust, etc., caused by polishing with a conventional free abrasive slurry. The methods in common use for final polishing includes driving a turntable at a low speed, adjusting the load on the ABS during polishing, or discontinuing the supply of a free abrasive slurry and supplying instead an abrasive-free liquid, e.g., only the dispersion medium for the above-mentioned free abrasive slurry.

Another common practice for the final polishing is the use of a polishing equipment designed exclusively for that purpose.

In some cases the final polishing of the ABS is followed by a polishing (hereinafter called "taper polishing") to provide a taper in the portion on the inflow side of. the ABS. The taper polishing, intended solely for the polishing of ceramics, is usually performed by altering the polishing conditions and feed liquid once changed for the final polishing back to the original conditions for height polishing, or by the use of an exclusive polisher for the taper polishing. Thus the prior art methods of polishing thin film magnetic heads which involve one or more final polishing steps in which the polishing conditions and the slurry or other polishing liquid have to be changed stepwise, had productivity problems such as long polishing periods and the need of separate polishing apparatus for a plurality of steps.

As for the lubricants for the polishing of composite materials made of materials varying in hardness, oily agents, antiwear agents, or extreme pressure agents have been used.

Typical oily agents include fatty acids, aliphatic alcohols, aliphatic amines, aliphatic esters, and oils and fats. They are believed to be amphiphatic substances having a long hydrocarbon chain in the molecule terminated with a strong polar group and capable of forming a lubricating film by physisorption or chemisorption on surfaces that rub each other, so that the film keeps the surfaces out of direct contact and reduces their friction. Oily agents are usually applied under relatively moderate light to medium load conditions. Severe, high-temperature heavy-load conditions would break the film and deteriorate its lubricity.

Antiwear agents such as phosphoric esters and metallic dithiophosphates are believed to decrease wear by forming a lubricating film through a tribologic chemical reaction with friction surfaces under the conditions of light to medium loads and elevated temperatures.

Under heavy load conditions, however, the film is broken by strong shear and heat of friction generated.

Extreme pressure agents are able to form films of greater shear strength than the films of oily agents and antiwear agents under demanding conditions of high temperatures and heavy loads. These extreme pressure agents are considered to have two mechanisms of action.

One mechanism forms a film by reaction with a metallic surface, and the other forms a film without reaction with a metallic surface but as a result of thermal decomposition of the molecules of the extreme pressure additive on a frictional surface. When a composite material made of materials varying in hardness is polished, the differences in hardness among the component materials result in varied amounts of elastic deformation, with less hard materials being preferentially polished more than the remainder. In uniform polishing is to be achieved, a lubricating film that effectively eliminates the variation in the amount of elastic deformation becomes necessary. Further problems arise from the polishing using conventional free abrasive slurry compositions. Since the polishing takes the advantage of microscopic scratching action of the abrasive powder, the operation has to be carried out under the conditions of localized high temperatures and high shear rates. If, in order to overcome the difficulty, an oily agent or antiwear agent that exhibits lubricity under relatively mild conditions is employed as a lubricant, the lubricating film will sometimes be broken, causing scratches or surface roughness of metallic films such as of Permalloy and Sendust.

Sulfur-containing organomolybdenum compounds have been objects of investigations as antiwear agents (P. C. H. Mitchell: "Oil Soluble Mo-S Compounds as Lubricant Additive", Wear, 100 (1984), pp.281–300; "*SEKIYU SEIHIN TENKAZAI NO KAIHATSU TO SAISHIN GIJUTSU*" (Developments and Latest Technologies of Oil Product Additives), compiled by Heihachiro Okabe, CMC (1998), pp.99–106; etc.). They have not been studied, however, as lubricants for polishing such composite materials made of materials varying in hardness as are handled under the present invention.

Problems that the Invention is to Solve

The present invention aims to provide a polishing slurry that can solve the problem of selective polishing of the soft material in a workpiece that is composed of soft and hard materials and to provide a polishing method using that polishing slurry. More particularly, the invention aims to provide a polishing method which uniformly finishes the ABS of thin film magnetic heads that are made of a plurality of materials varying in hardness (that is, finishes without difference in the amounts of polishing among the different-hardness materials, or without selective polishing). The method enhances productivity because it permits polishing in a. single step without the need of changing the type of free abrasive slurry or replacing the polisher, at no sacrifice of the polished quality of ABS that is obtained by the conventional height polishing process.

Means of Solving the Problem

The invention provides free abrasive slurry compositions for polishing composite materials made of materials varying in hardness.

The compositions include those comprising a polyol with a molecular weight of 300 to 20000, a polishing powder, a dispersion medium, and optionally a surfactant; and those comprising a sulfur-containing organomolybdenum compound, a polishing powder, a dispersion medium, and at least one member selected from the group consisting of surfactants, polymeric compounds, and surface modifiers.

The use of such a free abrasive slurry composition in the polishing of a material composed of constituents varying in hardness decreases the percentage of the regions where there is solid-to-solid contact and selectively lowers the friction coefficient of a less hard work surface. That means reducing the amount of removal of a component material which would otherwise be easily removed, resulting in uniform polishing without a difference in the amount of polishing between the materials varying in hardness.

BRIEF EXPLANATION OF THE DRAWING

FIGS. 1(*a*)–1(*b*) Shows a perspective view of a bar cut out from a wafer to form a magnetic head element as a workpiece to be polished.

Embodiment of the Invention

The present invention has been perfected to overcome the problem of selective polishing that arises in polishing a workpiece, especially a thin film magnetic head, composed of a soft material, notably a metal, having a Vickers hardness number (hereinafter called "HV") ranging from 26 to 360 and a hard material, notably a ceramic, having an HV from 700 to 4000, with a conventional polishing liquid in the form of a free abrasive slurry. The invention thus provides free abrasive slurry polishing liquids that can be mass produced in a simple operation and are capable of preventing the selective polishing to an industrial advantage and also provides polishing methods using those polishing liquids. The present inventors have made intensive research with the view to correcting the selective polishing, particularly the pole tip recession, in the course of polishing thin film magnetic heads;and obtaining a high-quality polished surface in a single step of operation.

It has now been found, as a result, that a free abrasive slurry composition comprising a polyol with a molecular weight of from 300 to 20,000, a polishing powder, a dispersion medium, and optionally a surfactant, and a composition comprising a sulfur-containing organomolybdenum compound, a polishing powder, a dispersion medium, and at least one member selected from the group consisting of surfactants, polymeric compounds, and surface modifiers, are capable of preventing the selective polishing and producing in a single process step an excellently polished surface free from scratch or roughness on a metallic film such as of a magnetic pole. The free abrasive slurry polishing liquids according to the present invention make final polishing unnecessary and thereby achieve improved productivity. The selective polishing-preventive, free abrasive slurry polishing liquids of the invention can be used in polishing ordinary ceramic-glass, glass-ceramic-metal, and other composite materials and are particularly suited for the polishing in the manufacture of thin film magnetic heads.

Polyols applicable to the present invention are prepared by the addition polymerization in the usual manner of one or more monomers selected from among ethylene oxide (EO), propylene oxide (PO), butylene oxide, amylene oxide, glycidyl ether, methylglycidyl ether, t-methylglycidyl ether, phenylglycidyl ether, etc., using as an initiator or initiators one or more compounds having two or more active hydrogen atoms selected from among, e.g., ethylene glycol, propanediol, butanediol, diethylene glycol, dipropylene glycol, trimethylene glycol, tetramethylene glycol, hexamethylene glycol, decamethylene glycol, neopentyl glycol, 3-methyl-1,5-pentanediol, glycerin, trimethylolpropane, pentlaerythritol, sorbitol; alcohols of sugars such as sucrose, glucose, and fructose; bisphenol A, ethylenediamine, propylenediamine, diethylenetriamine, toluenediamine, metaphenylenediamine, diphenylmethanediamine, xylylenediamine, etc.

Preferably they are polyethers obtained by the addition polymerization of EO, PO, etc. using glycerin, trimethylolpropane, etc. as the initiators and having from 1 to 6, preferably from 2 to 3, functional groups, with the ratio of PO/EO contained ranging from 100 to 25 wt %/0 to 75 wt %, preferably 100 to 80 wt %/0–20 wt %. Their end groups are in most cases primary or secondary hydroxyl groups, but one end may be terminated with Ian aliphatic hydrocarbon such as cetyl group or with a polymer such as AS, and their molecular weights range from 300 to 20000, preferably from 300 3000.

Examples of the polyols that satisfy these conditions are polyoxypropylene glycol monoether, poly(oxyethylene, oxypropylene) glycol monoethers, polyoxypropylated glycerin, polyoxypropylated sorbitol, poly(oxyethylene, oxypropylene) block polymers, poly(oxyethylene, oxypropylene) triols, poly(oxyethylene, oxypropylene) glycols, poly(oxyethylene, oxypropylene) polyols, and poly (oxyethylene, oxypropylene) cetyl ethers.

The concentration of such a polyol to be added is not less than 0.05 wt %, preferably not less than 0.2 wt %, more preferably from 0.2 to 50 wt %, on the basis of the weight of the free abrasive slurry composition.

The sulfur-containing organomolybdenum compound to be used under the invention includes salts of tetramolybdic acid ($MoS_4^{2-}$) with high-molecular amines (e.g., dodecyl ammonium tetramolybdate), $Mo_2O_2B_4$, $Mo_2O_4B_2$, $Mo_2O_3SB_2$, $Mo_2O_2S_2B_2$, $Mo_2OS_3B_2$, and $Mo_2S_4B_2$ (in which B represents a xanthogenate or dialkylxanthogenate, dithiocarbamate or dialkyldithiocarbamate, or dithiophosphate or dialkyldithiophosphate), molybdenum complexes of β-diketonates (e.g., acetylacetonate), molybdenum complexes of dithiols (e.g., toluene-3,4-dithiol), and 2,5-dimercapto-1,3,4-thiazoles. Particularly desirable are molybdenum dithiocarbamate (MoDTC) represented by the formula:

MoDTC and molybdenum dithiophosphate (MoDTP) represented by the formula:

MoDTP

Inorganic solid powders of molybdenum disulfide that have been popular as extreme pressure agents have not proved fully effective in preventing selective polishing. This is presumably because the inorganic solid powders that are commonly kneaded in a highly viscous medium to a greasy state before use as extreme pressure agents failed, in less viscous, more fluid slurries, to form an effective film along a frictional interface.

Unlike those inorganic solid powders, sulfur-containing organomolybdenum compounds are organometallic complexes and offer the additional advantage of easy handling since they are readily soluble in nonpolar solvents.

The concentration of a sulfur-containing organomolybdenum compound to be added has only to be above the saturation concentration sufficient for the compound to decompose with the heat of friction and form a lubricating film between a workpiece (especially a magnetic head) and a turntable. It is desirably not less than 0.05 wt %, more desirably not less than 0.2 wt %, and usually not more than 50 wt %, preferably not more than 20 wt %.

The use of an extreme pressure agent of sulfur-containing organomolybdenum compound according to the invention as a lubricant makes it particularly possible to polish, uniformly without any scratch, the ABS of a thin film magnetic head made of a plurality of materials varying in hardness. This is presumably accounted for by the fact that the sulfur-containing organomolybdenum compound decomposes with the heat of friction generated along the frictional surfaces under high-temperature, high-shear conditions and forms a film without reaction with the metallic surfaces, thus providing a layer structure based on molybdenum disulfide ($MoS_2$) and composed of layers bound by the van der Waals force, a weak intermolecular force, whereby the friction between the contacting surfaces is decreased since it is replaced with the friction between the layers inside the molybdenum disulfide (*"SEKIYU SEIHIN TENKAZAI NO KAIHATSU TO SAISHIN GIJUTSU"* (Developments and Latest Technologies of Oil Product Additives), compiled by Heihachiro Okabe, CMC (1998), pp.99–106; etc.). The phenomenon apparently acts effectively in reducing the difference in the amount of elastic deformation between materials of varying hardness.

There is no limitation to the dispersion medium to be used in the present invention only if it can dissolve the sulfur-containing organomolybdenum compound used. For thin film magnetic heads whose components such as Permalloy and Sendust form metallic films which usually tend to corrode or rust due to susceptibility to water, the use of a nonaqueous solvent, notably of low polarity, is advisable.

The expression "polarity of a dispersion medium" as used herein, in an ordinary sense, means a property based on a dipole formed in the molecule of a solvent depending on such factors as the atoms, type of their bond, atomic configuration and locations in the molecule. The magnitude of polarity is relatively governed by the polarities of interacting molecules.

The polarity of a solvent is qualitatively expressed in terms of the Hildebrand solubility parameter (sp), δ. The larger the δ value the larger the polarity, and vice versa. The δ values are classified into some groups depending on the intermolecular interactions such as dispersion, orientation by polarity, and hydrogen bond. Those values dictate the selectivity of compound dissolution or what solvent dissolves what compound well.

Organic solvents suited as dispersion mediums for the free abrasive slurry polishing liquids are desired to have low δ values. If the polar content is increased to the contrary, the dispersion medium will present an odor problem and will also have adverse effects upon both the human beings and the workpieces. Moreover, a solvent with a low rate of evaporation of the dispersion medium is suitable for the present invention in order to prevent the slurry evaporation during the course of polishing and ensure stable polishing operation. A dispersion medium with a high evaporation rate would dry up during operation and make it difficult to carry on stable polishing.

In view of the foregoing, a dispersion medium suited for use in the present invention is one having a solubility parameter, sp value, of not more than 10.0, preferably not more than 8.0 and a relative rate of not more than 5.0, preferably not more than 2.0. Examples of such a dispersion medium are Exxon Chemical Co.'s odorless isoparaffin solvents of "Isopar" series and low odor naphthenic solvents of "EXXSOL" series, and Mobile Chemical Co.'s n-paraffin solvents of "White rex" series and aliphatic solvents for industrial use tradenamed "Pegasol", "Pegawhite", and "Surtrex".

The polishing powder for the present invention is not specially limited; any powder in common use for polishing may be used. Examples are diamond, alumina, silicone carbide, cerium oxide, silicon oxide, and iron oxide. The polishing powder may be arbitrarily specified according to the hardness and types of composite material constituting the workpieces, amounts to be removed by polishing, accuracy required of the finished surface, etc. For the lapping of thin film magnetic heads finely divided diamond abrasive with a nominal particle size of less than 1 μm, preferably less than 0.5 μm, such as 0–1/10 μm, 0–1/8 μm, or 0–1/4 μm, is commonly used. The concentration of the polishing powder in the slurry composition, which usually ranges from about 0.01 to about 1.0 wt %, preferably from about 0.05 to about 0.4 wt %, must be adjusted in consideration of the efficiency and accuracy required of the polishing.

For the preparation of a stable dispersion system from the powder, good wettability of the solid-liquid interface is essential. By wettability is meant a phenomenon in which a liquid drives off gaseous matter from the surface of a solid mass. On the surface of dry powder air is strongly adsorbed and it must be replaced by a liquid. For a better wettability it is only necessary to increase the solid-liquid chemical affinity, and the closer the two are in polarity and chemical structure the greater the affinity.

The surface of the particles used as polishing powder, where there are polar functional groups such as surf ace hydroxyl groups, exhibits a hydrophilic nature. In a polar solvent with a high δ value such as water, the powder is highly wettable and can be easily dispersed. However, the dispersion medium to be used under the invention is a nonpolar solvent. To disperse the abrasive that is a hydrophilic powder uniformly in a nonpolar solvent, therefore, the affinity of the particle surface for the dispersion medium must be enhanced, and a hydrophobic treatment becomes necessary. Methods for the hydrophobic treatment of the particle surface include the addition of a surfactant, polymeric surface modifier, coupling agent, or other surface modifier.

The adoption of a surfactant as a surface modifier makes use of the fact that a surfactant is an amphiphatic substance having in its molecule a long, hydrophobic hydrocarbon chain and strong polar (hydrophilic) groups at the both ends. In other words, the interaction between the hydrophilic particle surface and the polar groups of the surfactant causes adsorption with the hydrophobic hydrocarbon chain directed outwardly and, as a whole, the particle surface changes its property from hydrophilic to hydrophobic. Consequently, the particles can remain stable without settling down in the nonpolar solvent.

When a surfactant is to be used in the practice of the invention, it should be soluble in a nonpolar solvent. Surfactants of this character generally have double or triple bond or a branch or branches in their skeleton. Nonionic surfactants are preferred to ionic ones which can induce corrosion of the magnetic part of a magnetic head.

Among those surfactants are: sorbitan fatty acid esters such as sorbitan monooleate, sorbitan sesquioleate, sorbitan trioleate; glycerin esters such as decaglyceryl pentaoleate, decaglyceryl pentaisostearate, decaglyceryl trioleate, hexaglyceryl pentaoleate, glyceryl monoisostearate, and diglyceryl monoisostearate; polyoxyethylene sorbitan fatty acid esters such as polyoxyethylene sorbitan tetraoleate; polyethylene glycol fatty acid esters such as polyethylene glycol 2EO and 6EO monooleates; and polyoxyethylene alkyl ethers such as POE (2) oleyl ether and POE (3) secondary alkyl ethers.

The concentration of the surfactant for use in the present invention is at least high enough to cause saturation adsorption of the particles. Although it varies with the surface properties of the polishing powder to be handled and with the surfactant itself, a concentration of 0.01 wt % or more i s desirable. Also, the concentration generally does not exceed 50 wt %. These limits are put because in a nonpolar solvent, compared with an aqueous system, the amount of adsorption of the surfactant in the first layer is so small that double-layer adsorption of the surfactant by dint of a hydrophobic-hydrophobic interaction is difficult to attain, and the surface properties do not change with an increase in the concentration of the surfactant as with an aqueous system.

A polymeric surface modifier or a coupling agent may also be utilized as a surface modifier.

Polymeric surface modifiers include the polymer brushes, such as poly(2-vinylpyridine)-polystyrene (PVPy-PS) and poly(vinylpyridine)-polyisoprene (PVPy-PIS), characterized in that one end of the polymer is strongly adsorbed on an interface and the remainder expands in a solvent. They are adsorbed on the surface of particles and form a thick adsorption layer, which is utilized in providing steric hindrance to keep of f the particles from one another.

Coupling agents include silane coupling agents such as vinyltrichlorosilane, vinyltris(β-methoxyethoxy)silane, vinyltriethoxysilane, vinyltrimethoxysilane, γ-(methacryloxypropyl-9-trimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, and γ-chloropropyltrimethoxysilane; titanate coupling agents such as isopropyltriisostearoyl titanate, isopropyltridodecylbenzenesulfonyl titanate, isopropyltris (dioctylpyrophosphate) titanate, tetraisopropylbis (dioctylphosphate) titanate, tetra(2,2-diallyloxymethyl-1-butyl)bis(ditridecyl)phosphite titanate, bis (dioctylpyrophosphate)oxyacetate titanate ("Plane-act KR138S" of Ajinomoto Co.), bis(dioctylpyrophosphate) ethylene titanate, isopropyltrioctanoyl titanate, isopropyldimethacrylisostearoyl titanate, isopropylisostearoyldiacryl titanate, isopropyltri(dioctylphosphate) titanate, isopropyltricumylphenyl titanate, isopropyltri(N-amidoethylaminoethyl) titanate, dicumylphenyloxyacetate titanate, and diisostearoylethylene titanate; and organoaluminum coupling agents such as acetalkoxyaluminum diisopropylate ("Plane-act Al-M" of Ajinomoto Co.), acetalkoxydiisopropylate, isobutyroxide, 2-octadecyloxide, and 2-ethylhexylisopropoxide.

The concentration of a polymeric surface modifier or coupling agent to be used for the invention is 0.01 wt % or more, though it varies with the surface properties of the polishing powder used. Also, the amount is usually not more than 50 wt %.

Such an agent is used to take the advantage of the phenomenon in which the surface functional groups on the powder surface and the surface modifier are bound by chemical reaction so as to change the surface nature of the particles from hydrophilic to hydrophobic. The hydrophobic treatment is not limited to the procedure described above.

Alternatively, any other hydrophobic treatment may be adopted if it allows a hydrophilic polishing powder to disperse uniformly in a nonpolar solvent.

For the manufacture of a free abrasive slurry composition according to the invention, any common method for preparing such a composition may be utilized. First, a proper amount of a surfactant is dissolved in a dispersion medium, and the solution is mixed with a suitable proportion of a polishing powder. In this state the hydrophilic polishing particles remain as an aggregated mass in a nonpolar solvent.

To disintegrate the aggregated mass into primary particles, dispersion is carried out. This dispersion step may use a conventional dispersing method and equipment. Concrete examples of useful apparatus include ultrasonic dispersion apparatus and various bead mills, kneaders, and ball mills.

Such a dispersion equipment disintegrates an aggregate into primary particles, allowing the exposed particle surface to adsorb a surfactant and achieve improved wettability, with the result that a slurry having good dispersion stability without aggregation can be prepared.

Typical of the techniques for analyzing the presence of a sulfur-containing organomolybdenum compound in a free abrasive slurry composition of the invention is the qualitative analysis using X-ray fluorescence. Specifically, the composition in the slurry form is examined with fluorescent X-rays, and the presence of the sulfur-containing organomolybdenum compound can be confirmed from the peaks at 2.293 keV and 2.307 keV resulting, respectively, from the La ray of molybdenum and from the kα ray of sulfur.

The workpieces to be polished in conformity with the present invention are of composite materials mostly composed of a soft material with an HV in the range of 26 to 360 and a hard material with an HV in the range of 700 to 4000. The soft and hard materials that constitute the composite may be one each or a plurality of materials each. The soft materials are specifically metals, e.g., Ti (HV 60), Pb (HV 37), Ag (HV 26), W (HV 360), V (HV 55), Nb (HV 80), Ta (HV 355), Pd (HV 38), Cr (HV 130), Ru (HV 350), Cu (HV 117), Pt (HV 39), Mo (HV 160), Th (HV 38), Ni (HV 60), Sendust (Fe–Al–Si, HV 600), Permalloy (Fe–Ni, HV 200), and aluminum (HV 200). The hard materials are ceramics, glass, etc., e.g., quartz glass (HV 620), AlTiC ($Al_2O_3$–TiC, HV 2500), TiC (HV 3200), AlN (HV 1370), $Si_3N_4$ (HV 2160), $ZrO_2$ (HV 700), cBN (HV 4000), $SiO_2$ (HV 620), SiC (HV 2400), hBN (HV 4700), $Al_2O_3$ (HV 2000), MgO (HV 920), $B_4C$ (HV 3200), and TaN (HV 1080).

When the workpieces to be polished are thin film magnetic heads, they usually have a structure in which, as shown in FIG. 2, materials of different hardness such as AlTiC, Sendust, Permalloy, and alumina are arranged mixedly.

The method of determining Vickers hardness is prescribed in JIS (Japanese Industrial Standards) Z2251. In practice a square-base pyramid diamond indenter having an apex angle of 136° is forced into the test specimen, and the HV is calculated from the test load applied to form an impression and from the diagonals of the resulting indentation, using the following equation:

$$HV=0.102(F/S)=0.102\cdot(2F \sin \theta/2)/d^2=0.18909F/d^2$$

where HV stands for Vickers hardness number, F is the test load (N), S is the surface area of the indentation, D is the length of average diagonal of the indentation (mm), and θ is the apex angle of the diamond indenter. The tester for measuring the Vickers hardness is defined in JIS B7725, and the standard hardness pieces for reference are defined for different materials, i.e., for steels (JIS G4401 and G4805), for brass(JISH3100), and for copper(JISH3100). Thesurface roughness in the range over which the standard pieces are used is specified by JIS B0601 (Surface Roughness) to be a mirror surface with 0.1s, and the parallelism of the front and back sides of the standard pieces are specified by JIS B0621 (Definition and Indication of Geometrical and Locational Accuracies) to be not greater than 0.02 mm per 50 mm.

WORKING EXAMPLES

The present invention is illustrated by the following examples, which should not be construed to be limitative.

Example 1
Confirmation of the Anti-Selective Polishing Effect of Polyol

In this example the effect derivable from the addition of a polyol was studied in polishing the ABS of a thin film magnetic head composed of AlTiC (HV 2500), Sendust (HV 500), Permalloy (HV 200), etc. The structure of the surface of the thin film magnetic head to be polished is shown in FIG. 2.

A slurry of the composition given in Table 1 was used as a free abrasive slurry according to the present invention. This slurry contained 5 wt % of a polyol as polyoxypropylene oxide monobutyl ether (marketed under the trade designation "Newpol" by Sanyo Chemical Ind. Co.). For comparison purposes, a polyol-free polishing slurry of the composition shown in Table 2 (Comparative Example 1) and a slurry not containing the polyol but containing the same proportion of sulfurized dioleyl compound ($C_{18}H_{35}SC_{18}H_{35}$) that is usually used for polishing composite materials of components varying in hardness as shown in Table 3 (Comparative Example 2) were similarly evaluated.

TABLE 1

Composition of the free abrasive slurry polishing liquid of Example 1

| Component | Proportion (wt %) |
|---|---|
| 0–0.25 μm diamond abrasive | 0.2 |
| Surfactant ("Rheodol SP-010") | 0.5 |
| Polyol ("LB1715") | 5.0 |
| Dispersion medium ("Isopar M") | 94.3 |
| Total | 100.0 |

TABLE 2

Composition of the free abrasive slurry polishing liquid of Comparative Example 1

| Component | Proportion (wt %) |
|---|---|
| 0–0.25 μm diamond abrasive | 0.2 |
| Surfactant ("Rheodol SP-010") | 0.5 |
| Dispersion medium ("Isopar M") | 99.3 |
| Total | 100.0 |

TABLE 3

Composition of the free abrasive slurry slurry polishing liquid of Example 1

| Component | Proportion (wt %) |
|---|---|
| 0–0.25 μm diamond abrasive | 0.2 |
| Surfactant ("Rheodol SP-010") | 0.5 |
| Sulfurized dioleyl compound | 5.0 |
| Dispersion medium ("Isopar M") | 94.3 |
| Total | 100.0 |

The basic composition common to all the free abrasive slurry polishing liquids used in the experiments comprised: diamond particles with a nominal size of 0 to 0.25 μm as a polishing powder, a nonpolar solvent "Isopar M" as a dispersion medium, and a nonionic surfactant sorbitan monooleate ("Rheodol SP-010" marketed by Kao Corp.). For the polishing experiments an automatic precision lapping machine manufactured by Engis Japan Corp. under the trade designation "HYPEREZ EJ-3801N" was used. As for the polishing conditions, tin/lead plates (rotational speed 50 rpm) were used as lapping plates, the slurry polishing liquid was sprayed for periods of 3 seconds at intervals of 30 seconds, and lapping was carried out under a load of 1300 g/cm² for an overall period of 30 minutes. The polished surface characteristics were evaluated in terms of the difference in level between the AlTiC/metal films of the thin film magnetic head after the polishing, or the pole tip recession (nm), as measured under a scanning probe microscope (AFM). The results of Example 1 and Comparative Examples 1 and 2 are summarized in Table 4.

TABLE 4

Comparison between effects of additive in free abrasive slurry polishing liquids

| Free abrasive slurry polishing liquid | Pole tip recession (nm) |
|---|---|
| Example 1 | 4.24 |
| Comparative Example 1 | 35.31 |
| Comparative Example 2 | 25.24 |

The results show that the free abrasive slurry according to the present invention (Example 1), compared with the polyol-free slurry (Comparative Example 1) produces a favorable selective polishing-preventive effect and that the polyol-containing slurry of the invention is particularly effective in preventing selective polishing of composite materials made up of materials greatly varying in hardness.

The polishing slurry containing the conventionally used sulfurized dioleyl compound (Comparative Example 2) exhibited a far less selective polishing-preventive effect than the polishing slurry of the invention.

This is because the polishing with the free abrasive slurry according to the invention involves less metal film removal.

Example 2

Confirmation of the Anti-Selective Polishing Effects with Different Polyols

In this example the influences of the molecular weight, PO/EO contents, number of functional groups, type of the end groups, etc. of the polyol upon the effect of preventing selective polishing were studied. For the purposes, compositions based on the composition of Table 1 and containing the various polyols listed in Table 5 were evaluated in the manner described in Example 1. The polyols used were polyoxypropylene monobutyl ethers ("LB-65", "-285", "-385", "-625", "-3000" of Sanyo Chemical Ind. Co.), polyoxypropylene monobutyl ether ("LB-1715" of Sanyo Chemical), poly(oxyethylene, oxypropylene)triol ("Newpol GEP-2800" of Sanyo Chemical), poly(oxyethylene, oxypropylene)glycol ("Newpol 75H-90000" of Sanyo Chemical), poly(oxyethylene, oxypropylene) polyol ("Newpol NSQ-800" of Sanyo Chemical), polyoxypropylated glycerin ("Sunnix GP-600" of Sanyo Chemical), polyoxypropylated sorbitol ("Sunnix SP-750" of Sanyo Chemical), and poly(oxyethylene, oxypropylene) cetyl ether ("PCB41" of Nikko Chemicals Co.).

TABLE 5

| No. | Polyol used | Hydroxyl value (mg-KOH/g) | No. of Functional groups | Molecular weight | Monomer proportion (wt %) PO | EO | Other | End group |
|---|---|---|---|---|---|---|---|---|
| 1 | Sanyo's "LB-65" | 330 | 2 | 340 | 100% | 0% | | OH |
| 2 | Sanyo's "LB-285" | 93.5 | 2 | 1200 | 100% | 0% | | OH |

TABLE 5-continued

| No. | Polyol used | Hydroxyl value (mg-KOH/g) | No. of Functional groups | Molecular weight | Monomer proportion (wt %) | | | End group |
|---|---|---|---|---|---|---|---|---|
| | | | | | PO | EO | Other | |
| 3 | Sanyo's "LB-385" | 74.8 | 2 | 1500 | 100% | 0% | | OH |
| 4 | Sanyo's "LB-625" | 60 | 2 | 1870 | 100% | 0% | | OH |
| 5 | Sanyo's "LB-3000" | 40 | 2 | 2800 | 100% | 0% | | OH |
| 6 | Sanyo's "LB-1715" | 46.8 | 2 | 2400 | 100% | 0% | | OH |
| 7 | Sanyo's "GEP-2800" | 65 | 3 | 2600 | 80% | 20% | | OH |
| 8 | Sanyo's "75H-90000" | 3.7 | 1 | 15000 | 25% | 75% | | OH |
| 9 | Sanyo's "NSQ-800" | 2.8 | 1 | 20000 | 25% | 75% | | OH |
| 10 | Sanyo's "GP-600" | 280 | 3 | 600 | 100% | 0% | | OH |
| 11 | Sanyo's "SP-750" | 480 | 6 | 700 | 100% | 0% | | OH, cetyl |
| 12 | Nikko's "PBC-41" | 77 | 1 | 730 | 64% | 6% | 30% | |
| | None (Comp. Ex. 1) | | | | | | | |

The basic composition of the free abrasive slurry polishing liquids used for the experiments was the same as that of Example 1 (Table 1).

Each polyol was added in an amount of 5.0 wt %. The polishing experiments were conducted using an automatic precision lapping machine "HYPEREZ EJ-3801N" manufactured by Engis Japan Corp. As for the polishing conditions, tin/lead plates (rotational speed 60 rpm) were used as lapping plates, the slurry polishing liquid was sprayed for periods of 3 seconds at intervals of 30 seconds, and lapping was carried out under a load of 250 g/cm² for an overall period of 30 minutes. All the free abrasive slurry polishing liquids that used 5 wt % of a polyol with a molecular weight in the range of 340–20000, a number of functional groups of 1–6, and PO/EO ratio of 100/0 to 25/75 proved highly effective in preventing selective polishing. For the purpose of comparison the free abrasive slurry polishing liquid of Table 2 was used for a similar polishing test. The results are given in Table 6.

TABLE 6

| No. | Pole tip recession (nm) |
|---|---|
| 1 | 5.20 |
| 2 | 5.75 |
| 3 | 5.35 |
| 4 | 4.24 |
| 5 | 6.25 |
| 6 | 4.24 |
| 7 | 5.20 |
| 8 | 5.35 |
| 9 | 4.24 |
| 10 | 4.98 |
| 11 | 5.24 |
| 12 | 4.20 |
| Comp. Ex. 1 | 28.92 |

Example 3
Effects of Concentration of Polyol Added

In this example the relationship between the concentration of a polyol added to a free abrasive slurry and the polishing characteristic of the resulting slurry was evaluated. The polyol used for this purpose was a polyoxypropylene monobutyl ether ("LB-1715" of Sanyo Chemical).

The concentration of the polyol added was varied within a range from 0 to 80 wt %. The basic composition of the free abrasive slurry polishing liquid and the method adopted for the evaluation of its polishing characteristics were the same as those in Example 1. Table 7 shows the results.

TABLE 7

| Amount of polyol ("LB-1715") added (wt %) | Pole tip recession (nm) |
|---|---|
| 0 | 35.31 |
| 0.01 | 20.21 |
| 0.05 | 10.22 |
| 0.1 | 8.00 |
| 0.2 | 4.20 |
| 0.5 | 5.35 |
| 1 | 4.24 |
| 2 | 4.44 |
| 5 | 4.98 |
| 10 | 4.31 |
| 20 | 4.25 |
| 30 | 3.99 |
| 50 | 4.89 |
| 70 | 4.22 |
| 80 | 4.84 |

The results indicated that a good selective polishing-preventive effect is attained by the addition of a polyol in an amount of not less than 0.05 wt %, preferably not less than 0.2 wt %, more preferably in the range of 0.2 to 50 wt %. No more favorable effect was produced by an increase in the concentration beyond 0.2 wt %. The same was true with the addition of 70 or 80 wt %.

Example 4
Effect of a Selective Polishing-Preventive Slurry Composition on the Manufacture of Thin Film Magnetic Head In this example the ABS of a thin film magnetic head was polished using the free abrasive slurry polishing liquid of Example 1. Here, as illustrated in FIG. 2, various thin films were formed on a substrate of AlTiC. From the composite material a thin film magnetic head was manufactured following the steps already described. For the polishing of the head the same polishing equipment and conditions as described in Example 1 were employed. For comparison purposes a thin film magnetic head was made using the conventional free abrasive slurry shown in Table 3. Height polishing was performed under the conditions described above, but the final polishing was done under modified conditions, e.g., by changing the rotational speed. The manufacturing method according to the invention bypassed the usually required final polishing and yet made it possible to produce an ABS of the same quality as that ordinarily obtained by final polishing. Thus the method of manufacturing a thin film magnetic head in conformity with the invention performs the height polishing and final polishing in a single step rather than in two as is usual in the art. The finishing of the ABS was immediately followed by taper polishing with a turntable as shown in FIG. 4. Since the polishing rate was stable, the length of the taper was easy to control.

The same applied to the cases where the free abrasive slurries of different compounds, composition, or contents according to Examples 2 and 3 were used in place of those in Example 1. The results were again the same when thin film magnetic heads were made using polishing equipment or conditions different from those in the present example.

Example 5

In this example the ABS of the thin film magnetic head shown in FIG. 2 was polished. To demonstrate the effect of the selective polishing preventives more definitely, no surfactant was used but the "LB-625" and "PCB-41" shown in Table 5 were used as additives for preventing selective polishing. Tables 8 and 9 give the compositions of the selective polishing-preventing slurry polishing liquids.

TABLE 8

| Component material | Weight ratio (wt %) |
| --- | --- |
| 0–0.25 μm diamond powder | 0.2 |
| Polyol "LB-625" | 5 |
| Dispersion medium ("Isopar M") | 94.8 |
| Total | 100 |

TABLE 9

| Component material | Weight ratio (wt %) |
| --- | --- |
| 0–0.25 μm diamond powder | 0.2 |
| Polyol "PCB-41" | 5 |
| Dispersion medium ("Isopar M") | 94.8 |
| Total | 100 |

For these polishing experiments an automatic precision lapping machine "HYPEREZ EJ-3801N" manufactured by Engis Japan Corp. was used.

The polishing conditions were as follows. Tin/lead plates as lapping plates were driven at a rotational speed of 50 rpm, the slurry polishing liquid was sprayed for periods of 3 seconds at intervals of 30 seconds, and lapping was carried out under a load of 1300 g/cm$^2$ for an overall period of 30 minutes. The polished surface characteristics were evaluated in terms of the difference in level between the AlTiC/metal films of the thin film magnetic head after the polishing, or the pole tip recession, as measured under a scanning probe microscope (AFM).

The experiments showed that even without a surfactant the slurries exhibited great capabilities of preventing selective polishing, proving more clearly the effectiveness of the selective polishing preventives according to this invention. The evaluation results are given in Table 10.

TABLE 10

| Composition | PTR (nm) |
| --- | --- |
| Table 8 | 4.82 |
| Table 9 | 4.23 |

Example 6
Confirmation of the Effect with Optical Fiber Connector

In this example an optical fiber connector built of zirconia (ZrO$_2$, HV 700) and quartz glass (SiO$_2$, HV 620) was used as a workpiece to be polished. Optical connectors easy to attach are used in fiber jointing for optical fiber communication networks. Each connector is composed of the fiber core at a fiber end and a so-called ferrule that covers the core. Two ferrules are held in tight contact to connect two fibers end to end. Since the ferrule jointing consists in direct butt jointing of ferrule ends that have a specified radius of curvature each, the optical characteristics, notably the reflection loss, at the joint depend largely on the polished geometry and precision at the ends of optical fiber ferrules. Optical fiber connectors, made of composite materials as noted above, have a problem that quartz glass, a soft component of the composites, is polished preferentially or selectively with the result that a gap is left in the butted joint, leading to a deviation from the designed refractive index and deterioration of the optical characteristics of the product.

In the example under review, a free abrasive slurry shown in Table 11, containing the "LB-835" in Table 5 as a polyol, was used.

TABLE 11

| Component material | Weight ratio (wt %) |
| --- | --- |
| 0–0.25 μm diamond powder | 0.2 |
| Polyol "LB-385" | 5 |
| Dispersion medium ("Isopar M") | 94.8 |
| Total | 100 |

For the polishing experiment an automatic precision lapping machine "HYPEREZ EJ-3801N" of Engis Japan Corp. was used. The polishing conditions were as follows. Tin/lead plates as lapping plates were driven at a rotational speed of 60 rpm, the slurry polishing liquid was sprayed for periods of 3 seconds at intervals of 30 seconds, and lapping was carried out under a load of 250 g/cm2 for an overall period of 5 minutes. When the free abrasive slurry of Table 11 was used, the difference in level of the polished end of the optical fiber connector was 80 Å, whereas the difference in level of the connector end polished with the free abrasive slurry of Table 2 by way of comparison was 850 Å. The present example indicated that the slurry of the invention is effective in preventing the selective polishing of the specific composite material made of materials varying in hardness.

Examples 7–9 and Comparative Examples 3–7

In these examples the effects produced by the addition of lubricants to slurries for polishing thin film magnetic heads built of AlTic, Sendust, and Permalloy were investigated.

The free abrasive slurry compositions used in these examples are shown in Table 12. The slurries used in the examples of the invention contained as a lubricant either molybdenum dithiocarbamate (MoDTC marketed under the trade name of "Molyvan-A" by R. T. Vanderbuilt Co., Inc.) or molybdenum dithiophosphate (MoDTP "Sunfric FM-2" by Sanyo Chemical). For comparison, a lubricant-free slurry and slurries containing, as a lubricant, zinc dialkyldithiophosphate (ZnDPO) as an antiwear agent, oleic acid as an oily additive, molybdenum disulfide as an extreme pressure agent in the form of inorganic solid powder, or sulfur-free organomolybdenum compound ("Molyvan 855" by R. T. Vanderbuilt Co.) were similarly tested.

For the polishing experiment an automatic precision lapping machine "HYPEREZ EJ-3801N" of Engis Japan Corp. was used. The polishing conditions were as follows. Tin/lead plates as lapping plates were driven at a rotational speed of 60 rpm, the slurry polishing liquid was sprayed for 3-second periods at intervals of 30 seconds, and lapping was carried out under a load of 250 g/cm$^2$ for an overall period of 30 minutes.

The polished surface characteristics were evaluated in terms of the difference in level between the AlTiC/metal films of the thin film magnetic heads after the polishing, or the pole tip recession (PTR) values, as measured under a scanning probe microscope (AFM). It is generally considered desirable that the PTR value is about 10 nm or less, preferably 5 nm or less, though it varies with the performance requirement. For scratch resistance rating, the AFM and a differential interference optical microscope were used. The results are summarized in Table 12.

organomolybdenum compound is decomposed by the heat of friction that is generated in the wearing surface under high-temperature, high-shear conditions to form a surface film based on $MOS_2$ which effectively acts to reduce the differences in the amount of elastic deformation among the materials varying in hardness that constitute the composite material workpiece.

Example 10

In this example the amounts of a sulfur-containing organomolybdenum compound to be effectively added to free abrasive slurry compositions were estimated. The sulfur-containing molybdenum compound used in the experiments was the same molybdenum dithiophosphate (MoDTP) as

TABLE 12

| Composition (wt %) | Example | | Comparative Example | | | | |
|---|---|---|---|---|---|---|---|
| | 7 | 8 | 3 | 4 | 5 | 6 | 7 |
| 0–0.25 μm diamond abrasive | 0.2 | 0.2 | 0.2 | 0.2 | 0.2 | 0.2 | 0.2 |
| Surfactant ("Rheodol SP-010") | 0.5 | 0.5 | 0.5 | 0.5 | 0.5 | 0.5 | 0.5 |
| Molybdenum dithiophosphate | 5.0 | — | — | — | — | — | — |
| Molybdenum dithiocarbamate | — | 5.0 | — | — | — | — | — |
| Molybdenum disulfide | — | — | — | 5.0 | — | — | — |
| "Molyvan 855" | — | — | — | — | 5.0 | — | — |
| ZnDPO | — | — | — | — | — | 5.0 | — |
| Oleic acid | — | — | — | — | — | — | 5.0 |
| Dispersion medium ("Isopar M") | 94.3 | 94.3 | 99.3 | 94.3 | 94.3 | 94.3 | 94.3 |
| Scratch resistance rating | Excel. | Excel. | Poor | Poor | Good | Good | Poor |
| PTR value (nm) | 4.68 | 4.53 | 37.19 | 20.25 | 18.86 | 15.18 | 32.21 |

The both systems that contained either sulfur-containing organomolybdenum compound as a lubricant gave good polish uniformity and freedom from scratch. This is presumably attributed to the fact that the sulfur-containing added to the free abrasive slurry composition in Example 7. The added amount of the compound was varied.

Wear tests were conducted in the same manner as in Example 7. The results are shown in Table 13.

TABLE 13

| Composition (wt %) | | | | | | | | | | | |
|---|---|---|---|---|---|---|---|---|---|---|---|
| 0–0.25 μm diamond abrasive | 0.20 | 0.20 | 0.20 | 0.20 | 0.20 | 0.20 | 0.20 | 0.20 | 0.20 | 0.20 | 0.20 |
| Surfactant ("Rheodol SP-010") | 0.50 | 0.50 | 0.50 | 0.50 | 0.50 | 0.50 | 0.50 | 0.50 | 0.50 | 0.50 | 0.50 |
| Molybdenum dithiophosphate | 0.00 | 0.05 | 0.10 | 0.20 | 0.50 | 1.00 | 2.00 | 5.00 | 10.00 | 20.00 | 50.00 |
| Dispersion medium ("Isopar M") | 99.30 | 99.25 | 99.20 | 99.10 | 98.80 | 98.30 | 97.30 | 94.30 | 89.30 | 79.30 | 49.30 |
| Scratch resistance rating | Poor | Good | Good | Excel. | Excel. | Excel. | Excel. | Excel. | Excel. | Excel. | Excel. |
| PTR value (nm) | 37.19 | 10.54 | 7.51 | 4.32 | 4.46 | 4.39 | 4.29 | 4.61 | 4.36 | 4.64 | 4.41 |

The results showed that 0.05 wt % or more, preferably 0.2 wt % or more, of the compound added brings good polish uniformity and non-scratched surface. Beyond a certain level of the addition, the characteristics remained practically unchanged. This means that the addition of the sulfur-containing organomolybdenum compound in excess of the amount that acts on the wearing surface gives no more favorable effect.

Effects of the Invention

As will be obvious from the foregoing description, the free abrasive slurry polishing liquids according to the present invention, when used in polishing workpieces, notably thin film magnetic heads, in which materials varying in hardness are mixedly present, prove highly effective in preventing the selective polishing of the soft material or materials in the composites.

What is claimed is:

1. In the manufacture of thin film magnetic heads having at least one soft material having a Vickers hardness in the range of 26 to 360 and at least one hard material having a Vickers hardness in the range of 700 to 4000, including a process for polishing, without causing substantial selective abrasion, the surface of each said head that serves as an air bearing surface, a polishing method which comprises the use of a free abrasive slurry composition comprising a polyol with a molecular weight ranging from 300 to 20,000, a polishing powder, a non-polar organic solvent as dispersion medium, said polyol being polyether obtained by addition reaction of propylene oxide or propylene oxide and ethylene oxide, the polyol having 1–6 hydroxyl groups.

2. The polishing method of claim 1, wherein the soft material is a metal, the hard material is a ceramic, and the polyol is a polyether obtained by the addition reaction of propylene oxide and optionally ethylene oxide, the polyol containing 1 to 6 function groups in the hydroxyl groups thereof.

3. The method according to claim 1, wherein the process for polishing is a single step in which a throat height is determined.

4. The method according to claim 2, wherein the process for polishing is a single step in which a throat height is determined.

5. The method according to claim 1, wherein the process for polishing is a single step in which an MR height is determined.

6. The method according to claim 2, wherein the process for polishing is a single step in which an MR height is determined.

* * * * *